United States Patent [19]

Carlson et al.

[11] Patent Number: 5,463,795
[45] Date of Patent: Nov. 7, 1995

[54] CONCEALED BEARING HINGE AND METHOD OF MAKING SAME

[75] Inventors: Thomas R. Carlson, Meriden; Richard M. Davidian, Kensington, both of Conn.

[73] Assignee: The Stanley Works, New Britain, Conn.

[21] Appl. No.: 204,652

[22] Filed: Mar. 2, 1994

[51] Int. Cl.$^6$ ..................................................... E05D 11/02
[52] U.S. Cl. ................................................ 16/273; 16/385
[58] Field of Search ........................................ 16/273, 385

[56] References Cited

U.S. PATENT DOCUMENTS

| | | |
|---|---|---|
| 1,961,730 | 6/1934 | Baker . |
| 3,015,126 | 1/1962 | Ahlgren . |
| 3,499,183 | 3/1970 | Parsons . |
| 3,725,973 | 4/1973 | Gwozdz . |
| 3,921,225 | 11/1975 | Suska . |
| 3,929,392 | 12/1975 | Ogino . |
| 4,353,146 | 10/1982 | Brockhaus . |
| 4,475,266 | 10/1984 | Suska . |
| 4,807,330 | 2/1989 | Gomes . |
| 5,062,181 | 11/1991 | Bobbowski et al. . |
| 5,075,928 | 12/1991 | Bobrowski .............................. 16/273 |
| 5,139,244 | 8/1992 | Chakko . |

FOREIGN PATENT DOCUMENTS

| | | | |
|---|---|---|---|
| 940663 | 1/1974 | Canada ..................................... | 16/273 |
| 1330499 | 9/1973 | United Kingdom ..................... | 16/273 |

Primary Examiner—Lowell A. Larson
Assistant Examiner—Donald M. Gurley
Attorney, Agent, or Firm—Pepe & Hazard

[57] ABSTRACT

A hinge includes a first hinge leaf with two axially spaced knuckles and a second hinge leaf having a knuckle extending between and axially aligned with the knuckles of the first hinge leaf. The knuckles of the two hinge leaves have bores extending therethrough and that of the second leaf has a counterbore at each end thereof. Seated in the bore at each end of the second leaf knuckle is a bearing assembly including a collar portion seated in the counterbore. The bushing has an axial bore extending therethrough and a counterbore at its outer end. A metallic thrust bearing has a generally axially extending body portion disposed in the counterbore of the bushing, and a peripheral collar at the outer end overlies the outer end of the bushing and provides a thrust bearing surface for the adjacent knuckle of the first hinge leaf. In one embodiment, the bushing bore has channels to allow flow of electroplating solution if the hinge is electroplated after assembly.

15 Claims, 4 Drawing Sheets

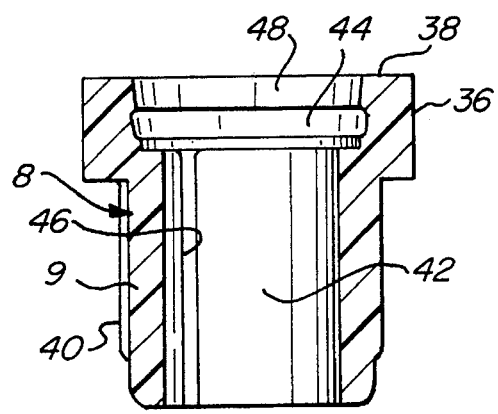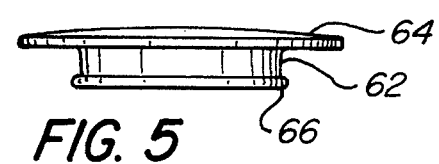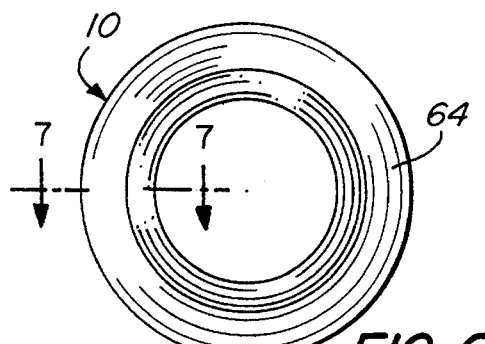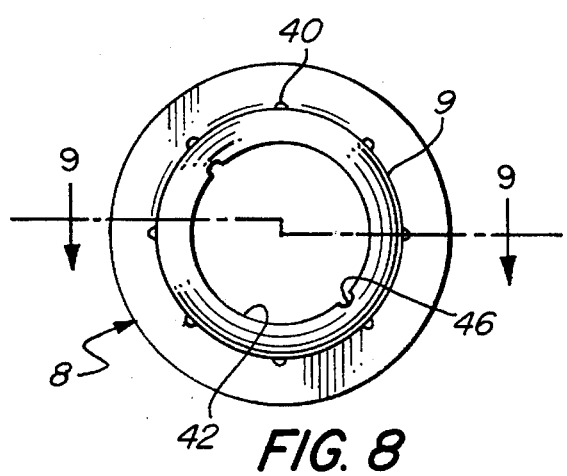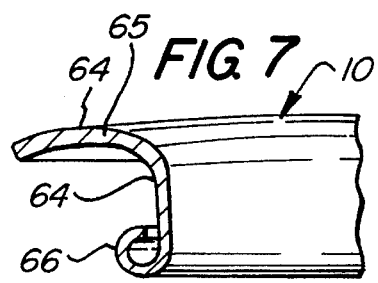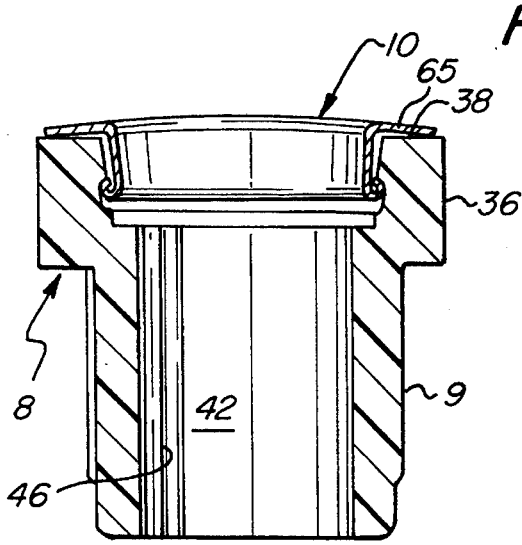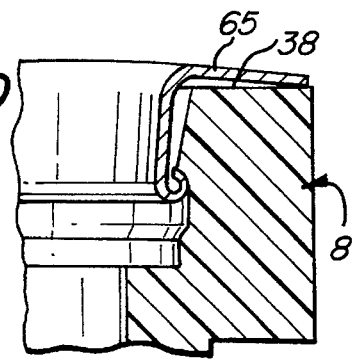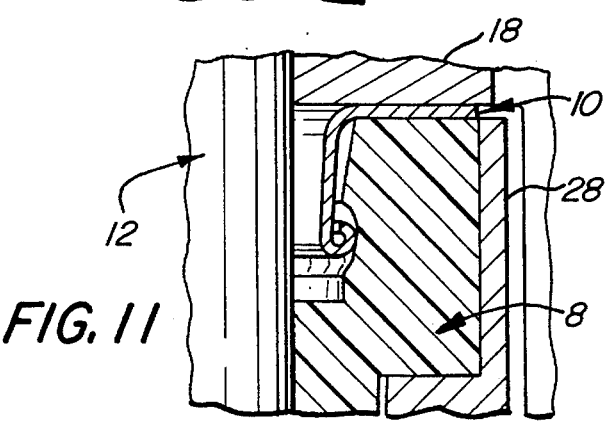

(51)

CONCEALED BEARING HINGE AND METHOD OF MAKING SAME

BACKGROUND OF THE INVENTION

The present invention relates to a hinge, and more particularly, to a concealed bearing hinge.

As is well known, it is desirable to provide hinges with bearings between the knuckles to reduce wear and to improve the pivotal action, thus enhancing the overall durability. To enable the effective use of bearing elements seated and between the adjacent knuckles, it is desirable that the vertical spacing between the knuckles be established to fairly close tolerances during the machining operation, and also that the diameter and axial length of counterbores seating bushings be machined quite precisely. If this is not done, the knuckles may interfit too loosely, and the bearing elements may not function effectively.

Moreover, it is desirable that the appearance of the barrel not be broken by the axial dimension of synthetic resin thrust bearing elements.

Less expensive hinges are generally fabricated from steel, and the leaves are electroplated prior to assembly. Assembling the electroplated components can lead to their being marred.

To reduce the cost of manufacturing electroplated hinges, it has been proposed that they be assembled and then electroplated. Doing so requires not only the appropriate selection of the materials but also a configuration of parts so that the electroplating solution and rinse water will not be retained in the assembled barrel.

It is an object of the present invention to provide a novel hinge which includes bearings which are substantially concealed.

It is also an object to provide such a hinge that permits greater tolerance in machining of the knuckles.

Another object is to provide such a hinge which may be assembled readily and economically.

A still further object is to provide such a hinge which is configured to permit electroplating of the hinge after it has been assembled.

SUMMARY OF THE INVENTION

It has now been found that the foregoing and related objects may be readily attained in a hinge comprising a first hinge leaf having at least two axially spaced knuckles with an axial bore therethrough, and a second hinge leaf having a knuckle extending between and axially aligned with the knuckles of the first hinge leaf. The knuckle of the second hinge leaf has an axial bore therethrough with a counterbore at each end thereof. Bearing assemblies are seated in each end of the knuckle of the second hinge leaf and extend between the knuckle of said second hinge leaf and the knuckles of the first hinge leaf.

Each of the bearing assemblies has a generally cylindrical synthetic resin bushing extending within the bore of the knuckle of the second hinge leaf, and a collar portion on the end of the bushings is seated in the counterbore. The bushing has an axial bore extending therethrough and a counterbore at its outer end. Each bearing assembly also includes a metallic thrust bearing with a generally axially extending body portion disposed in the counterbore of the bushing, and a peripheral collar at its outer end overlying the outer end of the bushing and providing a thrust bearing surface for the adjacent knuckle of the first hinge leaf. The thrust bearing is rotatable relative to the bushing together with the adjacent knuckle of the first hinge leaf. A hinge pin extends through the axial bores of the knuckles and bushings to secure the first and second hinge leaves in assembly.

Preferably, the collar of the thrust bearing, prior to application of a load to the hinge, has a deflectable portion projecting in spaced relationship above the outer end of the bushing and deflectable against the outer end of the bushing by a load placed thereon. Desirably, the bearing assembly further includes retaining means retaining the body portion of the thrust bearing within the counterbore of the bushing. This retaining means will generally include a groove extending about the periphery of the counterbore. The body portion of the thrust bearing includes a section seated in this groove, and the groove and section are cooperatively dimensioned and configured to allow the section limited axial movement within the groove, thereby allowing the body portion to move axially within the counterbore of the bushing. In one embodiment, the section of the body portion is a reversely bent portion at the inner end thereof.

Preferably, the surface of the bore of the bushing is provided with at least one axial channel extending from the counterbore to the other end thereof to permit the drainage of electroplating liquid if the assembled hinge is electroplated. The bushing also desirably includes a multiplicity of compressible bosses in the form of axially extending ribs on its outer periphery to provide enhanced frictional engagement of the bushing within the bore of the knuckle of the second hinge leaf.

In electroplating the assembled hinge, the hinge is immersed in an electroplating solution, and the solution is drained from within the bushing by means of the channels. Preferably, the bushing is frictionally engaged within the bore of the knuckle by compressing compressible ribs on its periphery.

BRIEF DESCRIPTION OF THE DRAWINGS

FIG. 4 is a sectional view of the bushing along the line 4—4 of FIG. 2;

FIG. 5 is a side elevational view of the thrust bearing of FIG. 3;

FIG. 6 is a bottom view thereof;

FIG. 7 is a fragmentary sectional view thereof along the line 7—7 of FIG. 6;

FIG. 8 is a bottom view of the thrust bearing and bushing assembly;

FIG. 9 is a sectional view thereof along the line 9—9 of FIG. 8;

FIG. 10 is a fragmentary enlarged sectional view of a portion of FIG. 9;

FIG. 11 is a view similar to FIG. 10, but also showing fragmentary portions of the hinge pin and adjoining knuckle of the assembled hinge, and further showing the thrust bearing deflected by a load applied to the hinge;

DETAILED DESCRIPTION OF THE ILLUSTRATED EMBODIMENTS

Figure 1:
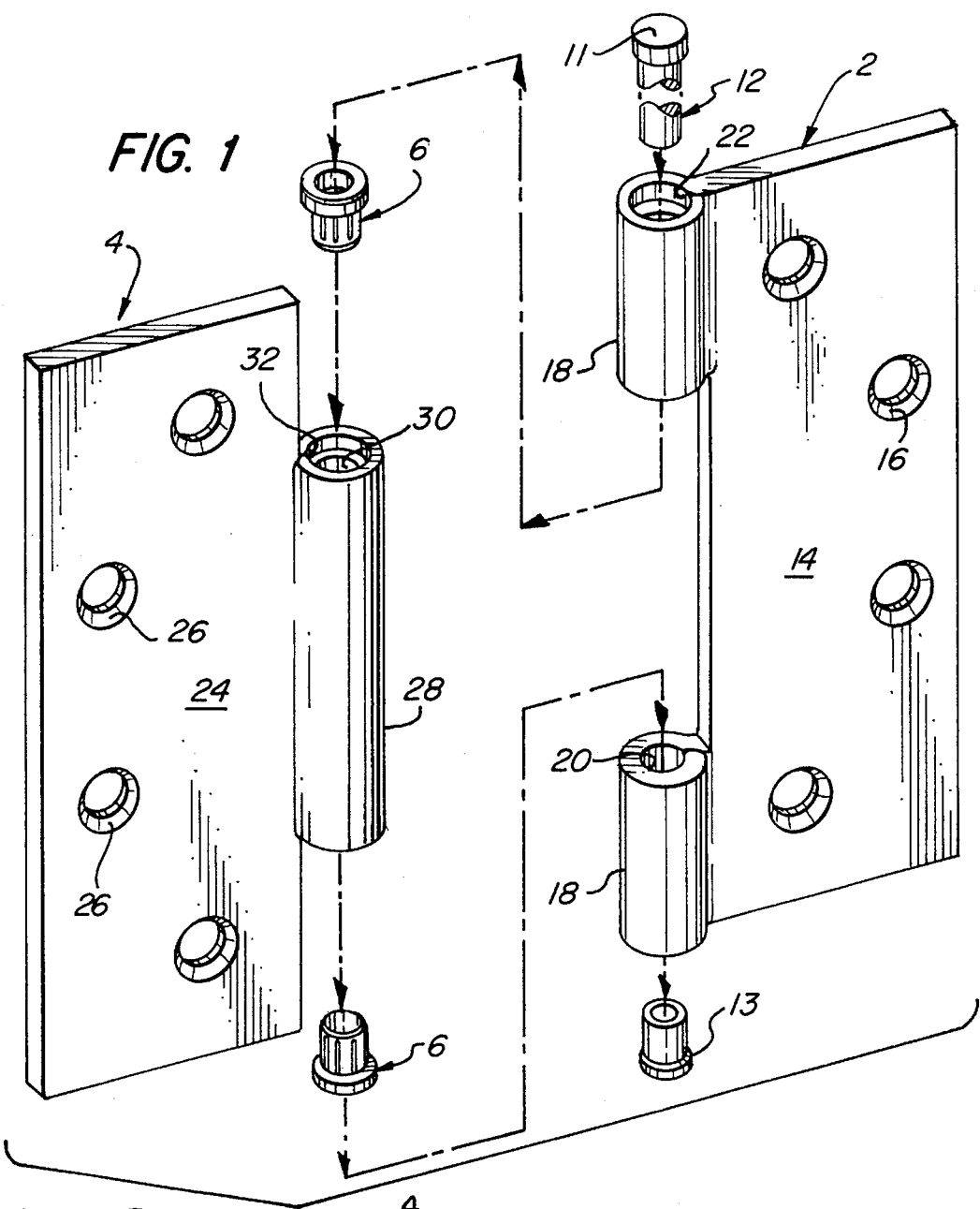
FIG. 1 is an exploded perspective view of a hinge embodying the present invention.

Turning first to FIG. 1, a hinge embodying the present invention has a hinge leaf generally designated by the numeral 2 secured in assembly with the hinge leaf generally designated as 4 by the hinge pin generally designated by the numeral 12. The hinge leaf 4 is provided with bearing assemblies generally designated by the numeral 6 which are formed from a bushing generally designated by the numeral 8 and a thrust bearing generally designated by the numeral 10 which is seated therein.

As best seen in FIG. 1, the hinge leaf 2 has a planar portion 14 provided with apertures 16 for mounting. Two knuckles 18 are axially spaced along the edge thereof and have an axial bore 20 with a counterbore 22 at the outer end for seating either the head 11 of the hinge pin 12 or the hinge pin cap 13. The hinge leaf 4 similarly has a planar portion 24 with apertures 26 for mounting, and a single knuckle 28 on its edge with an axial bore 30 and counterbores 32 at each end thereof. The knuckle 28 of the hinge leaf 4 extends between the two knuckles 18 of the hinge leaf 2 and is axially aligned therewith.

Figure 2:
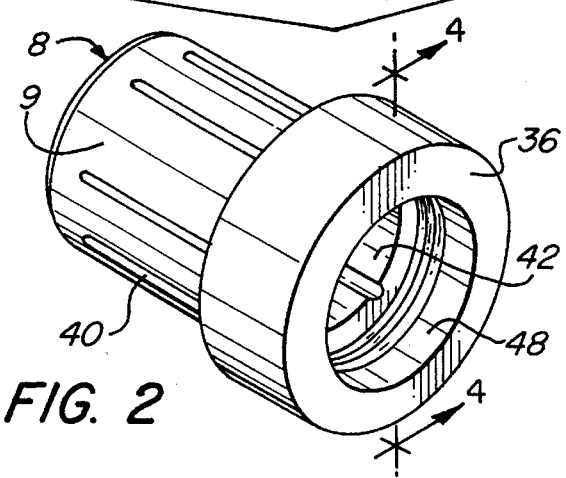
FIG. 2 is a perspective view of a bushing of the bearing assembly used therein drawn to an enlarged scale.
Figure 3:
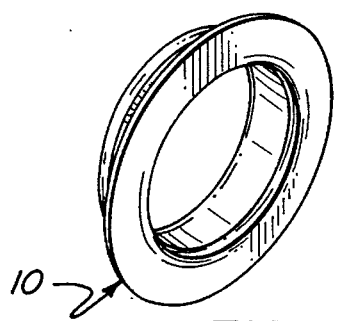
FIG. 3 is a perspective view of a thrust bearing of the bearing assembly also drawn to an enlarged scale.
Figure 12:
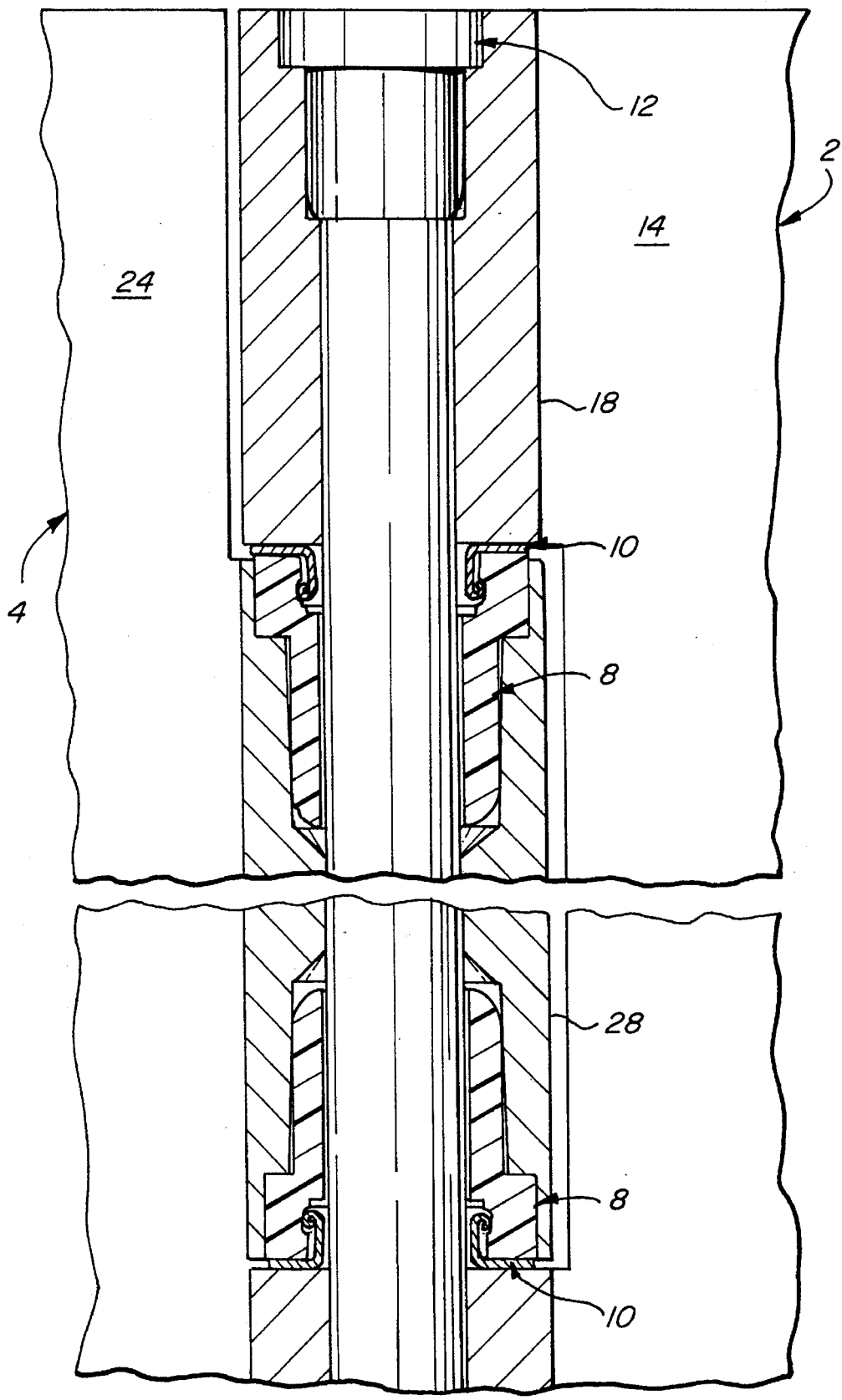
FIG. 12 is a fragmentary view of the hinge of FIG. 1 as assembled, drawn to an enlarged scale, and with the knuckles and bearing assemblies in section to show internal construction.
Figure 13:
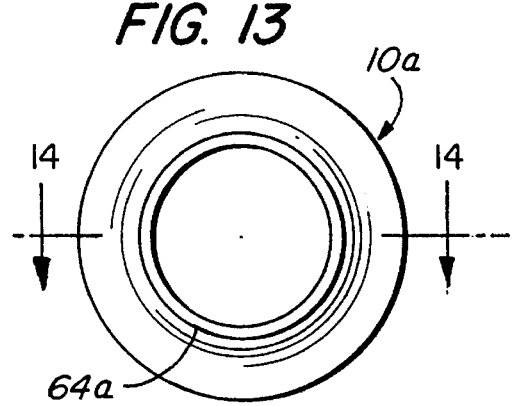
FIG. 13 is a plan view of another embodiment of a thrust bearing prior to assembly.
Figure 14:
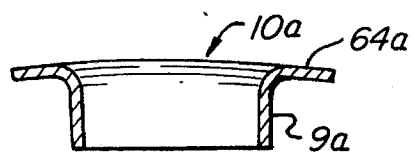
FIG. 14 is a sectional view thereof along the line 14—14 of FIG. 13.
Figure 19:
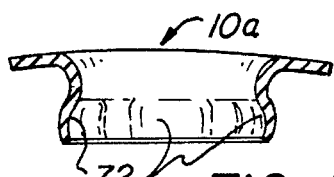
FIG. 19 is a view similar to FIG. 14 after flaring of the thrust bearing.
Figure 15:
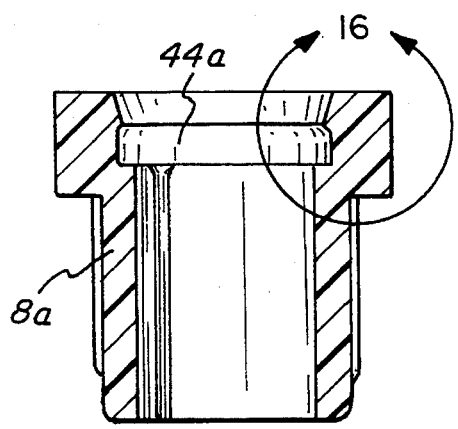
FIG. 15 is a longitudinal sectional view of another embodiment of bushing used with the thrust bearing of FIG. 13.

Referring to FIGS. 2 and 4, the bushing 8 has a generally cylindrical body 9 and a collar 36 at its outer end. As best seen in FIGS. 1 and 12, the bushing 8 is seated within the bore 30 of the knuckle 28 of the hinge leaf 4 and with its collar 36 seated in the counterbore 32. The bushing 8 has an axial bore 42 and compressible axially extending ribs 40 at the outer periphery of its body 9 allowing the bushing 8 to be frictionally engaged in the bore 30.

The axial bore 42 of the bushing 8 has a counterbore 48 at its outer end, and the other portion of the counterbore 48 tapers outwardly to facilitate insertion of the thrust bearing 10. A groove 44 extends about the periphery of the counterbore 48 of the bushing 8 directly below the outwardly tapering portion. A pair of axial channels 46 is provided in the axial bore 42 and extend from the counterbore 48 to the other end of the body 9.

Referring next to FIGS. 3 and 5–7, the thrust bearing 10 has a body portion 62 with a peripheral collar 64 extending from the outer end thereof and a reversibly bent portion 66 at its inner end to provide a section of the body portion 62 which seats in the groove 44 of the counterbore 48. The collar 64 is formed with a convex or domed configuration as seen in FIG. 5.

Turning to FIGS. 8–11, the bearing assembly 6 is formed by inserting the inner end of the body portion 62 of the thrust bearing 10 into the counterbore 48 of the axial bore 42 of the bushing 8. The reversibly bent portion 66 moves along the outwardly tapering portion of the counterbore 48 until it snaps into and is seated in the circumferential groove 44. Thus, the body portion 62 of the thrust bearing 10 is disposed within the counterbore 48 of the bushing 8, and a portion 65 of its peripheral collar 64 projects in spaced relationship above and overlies the outer end of the bushing 8. As thus assembled, the thrust bearing 10 is rotatable relative to the bushing 8.

As best seen in FIG. 11, when the hinge is mounted on a door and the adjacent knuckle 18 of the hinge leaf 2 abuts and bears down on the portion of the peripheral collar 64 projecting in spaced relationship above the outer end of the bushing 8, the collar 64 is deflected against the outer end by the load placed on it.

The circumferential groove 44 and the reversibly bent portion 66 are dimensioned and configured to allow the reversibly bent portion 66 to have limited axial movement within the groove 44. This permits the body portion 62 of the thrust bearing 10 to move axially within the axial bore 42 of the bushing 8 when the portion of the peripheral collar 64 projecting in spaced relationship above the outer end of the bushing 8 is deflected against the outer end 38. When the collar 64 is not deflected, the reversibly bent portion 66 of the thrust bearing 10 is adjacent the upper curved surface of the circumferential groove 44. When the collar 64 is deflected, the reversibly bent portion 66 moves to a position adjacent the lower surface of the circumferential groove 44.

In assembling the leaves 2 and 4, the configuration of the collar 64 on the thrust bearing 10 facilitates the assembly by guiding the knuckle 28 between the knuckles 18, and its ability to deflect permits greater axial tolerance in the fabrication of the various parts while ensuring tension between the knuckles.

The axial ribs 40 on the body of the bushing 8 compress when the bushing 8 is inserted into the bore 30 to provide secure frictional engagement of the bushing within the knuckle 28 so that it will not rotate relative thereto.

When the hinge pin 12 is inserted into the knuckles, it is frictionally engaged in the bore 20 of the knuckles 18 of the hinge leaf 2, and it rotates within the bushings 8. Under load, the thrust bearing 10 rotates with the knuckles 18 bearing on the collar 64 of the bushing 8.

If so desired, the parts may be initially assembled and the entire hinge may then be electroplated as the axial channels 46 in the axial bore 42 of the bushing 8 serve to drain the electroplating liquid and rinse water from within the bushing 8. For such a plating step, the bushing 8 may be fabricated from a conductive synthetic resin such as one having a carbon filler.

Referring to FIGS. 13–19, there is shown a preferred embodiment of the bushing 8a and thrust bearing 10a in which the inner end of the body portion 9a of the thrust bearing 10a has four equally spaced flared portions 72 in place of the reversibly bent portion 66 of the previous embodiment. Each of the flared portions 72 subtends an angle of 75° of the circumference of the body portion 9a and flares outwardly to a point of maximum flare.

Figure 16:
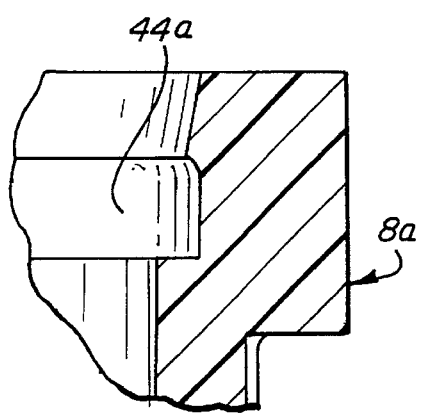
FIG. 16 is a fragmentary enlarged portion of FIG. 15.
Figure 17:
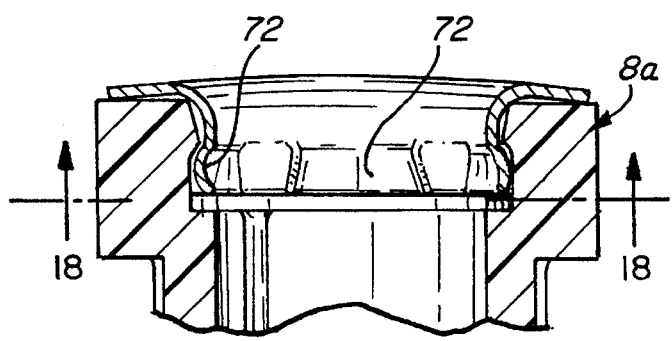
FIG. 17 is a fragmentary enlarged portion of the bearing assembly produced from the thrust bearing and bushing of FIGS. 13–16, after the thrust bearing has been flared to effect its retention.
Figure 18:
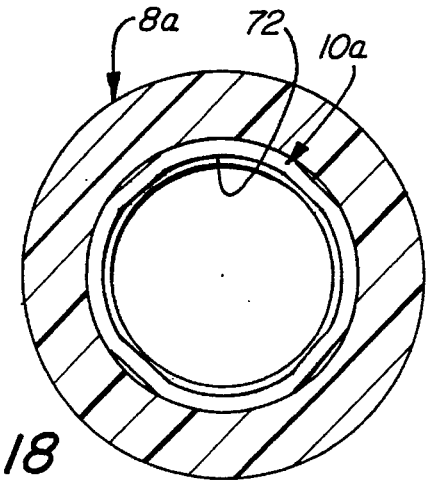
FIG. 18 is a cross sectional view thereof along the line 18—18 of FIG. 17.

As best seen in FIG. 16, the circumferential groove 44a of the bushing 8a has, in cross section, an upper curved surface and an elongated generally flat axial surface to accommodate the axial length of the flared portions 72. Similarly to the previous embodiment, the flared portions 72 provide a section of the body portion 9a which seats in the groove 44a.

As will be appreciated, the bearing 10a is easily deformed by opposed flaring tools after it is placed within the bushing 8a. However, the radius on the flared portions 72 allows the thrust bearing 10a to be removed and reinserted.

This embodiment, in addition to being generally easier to fabricate than the previous embodiment, offers the additional advantage of increasing the surface area of the thrust bearing 10a. Further, the configuration of the flare 72 facilitates the insertion and removal of the thrust bearing 10a from the bushing 8a. When assembled, it can be seen that the bearing assembly has only the relatively thin collar of the thrust bearing disposed between the adjacent knuckles so that the bearing assembly is substantially concealed, thus providing an attractive hinge with a substantially uniform line in its barrel portion. However, the bushings provide excellent bearing surfaces on which the hinge pin and thrust bearing rotate. The thrust bearing in turn rotates freely with the adjacent knuckle and provides a smooth surface bearing upon the bushing so as to substantially eliminate abrasive wear.

The bushings are molded from a durable, high lubricity synthetic resin and desirably may be one which is conductive to facilitate electroplating of the assembled hinge. Suitable resins include polyamide, polypropylene and polyacetal, and a presently preferred material is a polyamide reinforced with aramid fibers and containing dispersed silicone and polytetrafluoroethylene lubricants. Conductivity may be provided by a graphite filler. The thrust bearing is desirably formed from stainless steel by an eyelet machine or by progressive die stamping.

Although the present invention has been illustrated and described with respect to a three knuckle hinge, it is equally applicable to hinges having four or more knuckles albeit only one bearing assembly may be employed in some knuckles.

Thus, it can be seen from the foregoing detailed specification and attached drawings that the concealed hinge of the present invention provides desirable tension between the knuckles while allowing greater tolerance in machining. Additionally, the hinge of the present invention is configured to facilitate the assembly of the hinge leaves by enabling the ready axial alignment of the knuckles to form the hinge barrel. The hinge also permits electroplating of the leaves after their assembly.

Having thus described the invention, what is claimed is:

1. A hinge comprising:
   (a) a first hinge leaf having at least two axially spaced knuckles with an axial bore therethrough;
   (b) a second hinge leaf having a knuckle extending between and axially aligned with said knuckles of said first hinge leaf, said knuckle having an axial bore therethrough with a counterbore at each end thereof;
   (c) bearing assemblies seated at each axial end of said knuckle of said second hinge leaf and extending between said knuckle of said second hinge leaf and said knuckles of said first hinge leaf, each of said bearing assemblies having a generally cylindrical synthetic resin bushing extending axially within said bore of said knuckle of said second hinge leaf, and a collar portion thereon seated in said counterbore with its axially outer surface flush with the axial end of said knuckle, said bushing having an axial bore extending therethrough and a counterbore at its outer end, each bearing assembly also including a metallic thrust bearing with a generally axially extending body portion disposed in said counterbore of said bushing and a peripheral collar at its outer end overlying the outer end of said bushing and providing a thrust bearing surface for the adjacent knuckle of said first hinge leaf, said collar being relatively thin and having a portion projecting in spaced relationship above said axial outer surface of said bushing, said projecting portion being deflectable against said axially outer surface of said bushing by a load placed thereon, said thrust bearing being rotatable relative to said bushing together with the adjacent knuckle of said first hinge leaf; and
   (d) a hinge pin extending through said axial bores of said knuckles and bushings to secure said first and second hinge leaves in assembly.

2. The hinge in accordance with claim 1 wherein said bearing assembly further includes retaining means retaining said body portion of said thrust bearing within said counterbore of said bushing.

3. The hinge in accordance with claim 2 wherein said retaining means includes a groove extending about the periphery of said counterbore and said body portion of said thrust bearing includes a section seated in said groove.

4. The hinge in accordance with claim 3 wherein said groove and section are cooperatively dimensioned and configured to allow said section limited axial movement within said groove, thereby allowing said body portion to move axially within said counterbore of said bushing.

5. The hinge in accordance with claim 3 wherein said section of said body portion is a reversely bent portion at the axial inner end thereof.

6. The hinge in accordance with claim 1 wherein the surface of the bore of said bushing is provided with at least one axially extending channel extending from said counterbore to the other end thereof to permit the drainage of electroplating liquid.

7. The hinge in accordance with claim 1 wherein said bushing includes a multiplicity of compressible bosses on the outer periphery of said body portion providing enhanced frictional engagement of said bushing within said bore of said knuckle of said second hinge leaf.

8. The hinge in accordance with claim 7 wherein said bosses are axially extending ribs.

9. A hinge comprising:
   (a) a first hinge leaf having at least two axially spaced knuckles with an axial bore therethrough;
   (b) a second hinge leaf having a knuckle extending between and axially aligned with said knuckles of said first hinge leaf, said knuckle having an axial bore therethrough with a counterbore at each end thereof;
   (c) bearing assemblies seated on each axial end of said knuckle of said second hinge leaf and extending between said knuckle of said second hinge leaf and said knuckles of said first hinge leaf, each of said bearing assemblies having a generally cylindrical synthetic resin bushing extending within said bore of said knuckle of said second hinge leaf and a collar portion thereon seated in said counterbore with its axially outer surface flush with the axial end of said knuckle, said bushing having an axial bore extending therethrough and a counterbore at its outer end, each bearing assembly also including a metallic thrust bearing with a generally axially extending body portion disposed in said counterbore of said bushing and a peripheral collar at its outer end overlying the outer end of said bushing and providing a thrust bearing surface for the adjacent knuckle of said first hinge leaf, said thrust bearing being rotatable relative to said bushing together with the adjacent knuckle of said first hinge leaf, said collar of said thrust bearing being relatively thin, prior to application of a load to said hinge, having a portion projecting in spaced relationship above said axially outer surface of said bushing, said projecting portion being deflectable against said outer end of said bushing by a load placed thereon, said bearing assembly further including retaining means retaining said body portion of said thrust bearing within said counterbore of said bushing; and (d) a hinge pin extending through said axial bores of said knuckles and bushings to secure said first and second hinge leaves in assembly.

10. The hinge in accordance with claim 9 wherein said retaining means includes a groove extending about the periphery of said counterbore and said body portion of said thrust bearing includes a section seated in said groove.

11. The hinge in accordance with claim 10 wherein said groove and section are cooperatively dimensioned and configured to allow said section limited axial movement within said groove, thereby allowing said body portion to move axially within said counterbore of said bushing.

12. The hinge in accordance with claim 9 wherein the surface of the bore of said bushing is provided with at least one axially extending channel extending from said counterbore to the other end thereof to permit the drainage of electroplating liquid.

13. The hinge in accordance with claim 9 wherein said bushing includes a multiplicity of compressible axially extending ribs on its outer periphery providing enhanced frictional engagement of said bushing within said bore of said knuckle of said second hinge leaf.

14. A method of making a hinge comprising the steps of:

(a) providing a first hinge leaf having at least two axially spaced knuckles with an axial bore therethrough, and a second hinge leaf having a knuckle with an axial bore therethrough and with a counterbore at each axial end thereof;

(b) forming bearing assemblies comprising a generally cylindrical synthetic resin bushing with a collar portion at one end thereof and an axial bore extending through said bushing with a counterbore at said one, and a metallic thrust bearing with a generally axially extending body portion disposed in said counterbore of said bushing and a relatively thin peripheral collar at one end overlying said one end of said bushing, said thrust bearing being rotatable relative to said bushing, said bushing being formed with at least one axial channel in the surface of the bore of said bushing extending from said counterbore to the other end thereof, said collar of said bushing having a portion projecting in spaced relationship above the outer surface of said one end of said bushing;

(c) inserting one of said bearing assemblies in each end of said bore of said knuckle of said second hinge leaf and seating said collar portion of said bushing in said counterbore thereof with its axially outer surface at said one end flush with the end of said knuckle;

(d) inserting said knuckle of said second hinge leaf between said knuckles of said first hinge leaf whereby each of said bearing assemblies has a portion extending between said knuckle of said second hinge leaf and one of said knuckles of said first hinge leaf, whereby said peripheral collar of said thrust bearing provides a thrust bearing surface for the adjacent knuckle of said first hinge leaf;

(e) inserting a hinge pin in said axial bores of said knuckles and bushings to provide a hinge assembly;

(f) immersing said hinge assembly in an electroplating solution; and (g) draining electroplating solution from within said bushing through said channels.

15. The method of making a hinge in accordance with claim 14 wherein said forming step includes forming the bearing assembly from a bushing including a multiplicity of compressible axially extending ribs on the outer periphery of its body portion, and said bearing assembly inserting step includes the step of frictional engaging said bushing within said bore of said knuckle by compressing said ribs.

* * * * *

UNITED STATES PATENT AND TRADEMARK OFFICE
CERTIFICATE OF CORRECTION

PATENT NO. : 5,463,795
DATED : November 7, 1995
INVENTOR(S) : Thomas R. Carlson, Et Al It is certified that error appears in the above-indentified patent and that said Letters Patent is hereby corrected as shown below:

Column 7, Line 27, after "said" insert --body portion of said--.

Column 8, line 1, after "one" insert --end--.

Signed and Sealed this

Ninth Day of April, 1996

Attest:

BRUCE LEHMAN

Attesting Officer

Commissioner of Patents and Trademarks